T. ECKERS.
CEREAL COOKER.
APPLICATION FILED JAN. 7, 1911.

1,054,097.

Patented Feb. 25, 1913.

Witnesses:
E. C. Lillian,
J. C. Conaven

Inventor:
Theodore Eckers,
By F. G. Fischer, atty.

UNITED STATES PATENT OFFICE.

THEODORE ECKERS, OF KANSAS CITY, MISSOURI.

CEREAL-COOKER.

1,054,097.  Specification of Letters Patent.  Patented Feb. 25, 1913.

Application filed January 7, 1911. Serial No. 601,478.

*To all whom it may concern:*

Be it known that I, THEODORE ECKERS, a citizen of the United States, residing at Kansas City, in the county of Jackson and State of Missouri, have invented certain new and useful Improvements in Cereal-Cookers, of which the following is a specification.

My invention relates to improvements in cereal cookers, and is especially adapted for preparing oat-meal for table use.

Figure 1:
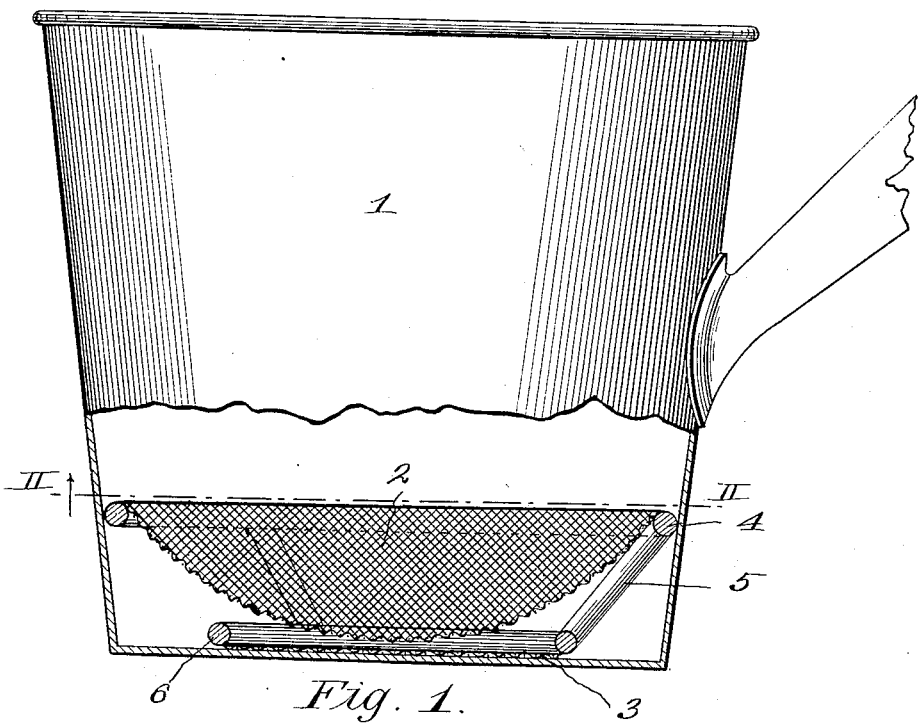
Figure 2:
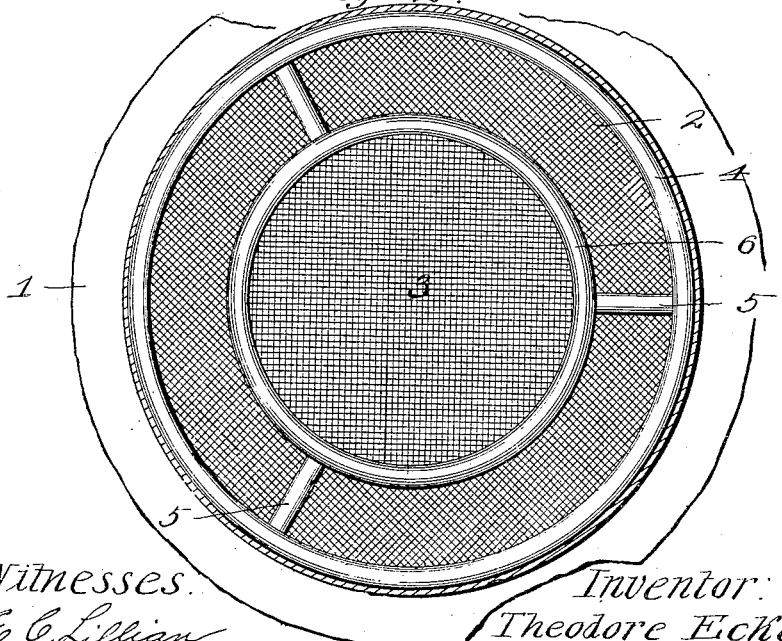

The principal object of the invention is to prevent the cereal from burning during the process of cooking, and in order that the invention may be fully understood, reference will now be made to the accompanying drawing in which:

Figure 1 shows a side elevation partly in section of my improved cooker. Fig. 2 is an inverted cross section on line II—II of Fig. 1.

1 designates a flat bottomed vessel of ordinary or preferred form.

2 and 3 designate two superimposed metallic screens, the former being arranged above the latter.

Screen 2 is of sectional spheroidal form, secured at its margin to a wire annulus 4, which in turn is supported by a plurality of inclined arms 5, secured at their lower ends to a wire annulus 6, surrounding the lower flat screen 3, which is adapted to rest directly upon the bottom of vessel 1. Annulus 4 is greater in diameter than annulus 6, and fits snugly against the interior of the vessel 1, as shown in Fig. 1, to prevent the cereal within said vessel from sifting downward between the interior thereof and the exterior of said annulus. With the foregoing construction an annular space is left between the annulus 6 and the sides of the vessel through which boiling water may ascend unimpeded to that part of the cereal resting on the upper portion of screen 2, and hence said portion will cook as rapidly as the cereal in the lower central part of screen 2, which is protected from intense heat by the flat screen 3. Screen 2 supports the cereal a slight distance above the bottom of the vessel so that the cereal cannot burn, and stirring thereof will be unnecessary, even though the vessel be left upon a fire after the process of cooking has been completed. Screen 2 also supports the cereal in such manner that the steam generated from the boiling water within the vessel may permeate the cereal from all sides and thus hasten the cooking process.

As steam is generated at the interior bottom portion of vessel 1, it passes vertically upward, and if unobstructed, would cook that portion of the cereal at the central lower portion of screen 2 first. Screen 3, however, retards the upward passage of the steam and causes a portion thereof to flow outwardly and ascend around annulus 6, so that the flow of steam throughout the cereal will be uniform, and cooking of the entire body of cereal will accordingly be uniform.

The screens and their annuli are of sufficient weight to prevent them from being lifted or displaced by the boiling water within the vessel and the steam generated therefrom.

Having thus described my invention, what I claim and desire to secure by Letters Patent, is:

In combination with a flat bottomed vessel, a wire annulus of less diameter than said vessel to leave an annular space, a flat wire screen secured to the underside of said annulus and adapted to lie directly upon the bottom of the vessel, a second wire annulus spaced above the first-mentioned one and fitting snugly against the interior of the vessel, inclined arms connecting said annuli, and a wire screen of sectional spheroidal form depending from the upper annulus and overhanging the annular space between the lower annulus and the sides of the vessel, substantially as shown and described.

In testimony whereof I affix my signature, in the presence of two witnesses.

THEODORE ECKERS.

Witnesses:
F. G. FISCHER,
E. C. LILLIAN.

Copies of this patent may be obtained for five cents each, by addressing the "Commissioner of Patents, Washington, D. C."